Patented Apr. 15, 1952

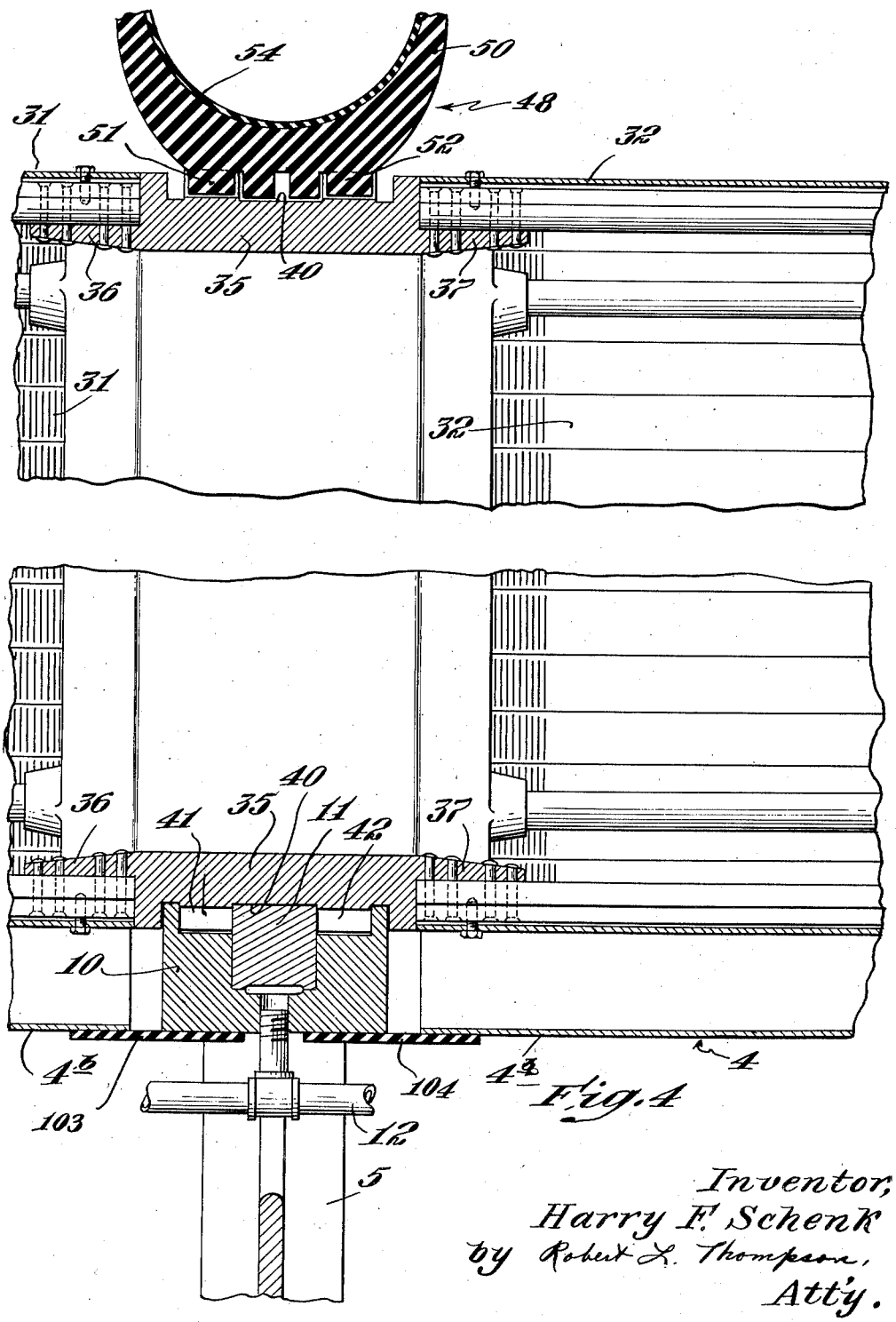

2,593,202

UNITED STATES PATENT OFFICE 2,593,202

APPARATUS FOR SCREENING A SUSPENSION OF SOLID MATERIAL IN A LIQUID

Harry F. Schenk, Sterling, Mass.

Application January 24, 1947, Serial No. 724,196

2 Claims. (Cl. 92—36)

1

This invention relates to a screening apparatus of the type suitable for removing solids of predetermined size and character from liquid suspensions and, as illustrative of its utility, the invention is herein shown with reference to its use in screening aqueous suspensions of fibers in connection with pulp and paper making operations.

In the manufacture of paper it is now customary to separate dirt and other undesirable solids from an aqueous suspension of pulp by passing the suspension through a rotating cylindrical or prismatic screen of the inflow type and withdrawing the screened suspension from the one open end of the prismatic screen. The screen is partially submerged in an elongate U-shaped tank to which the unscreened suspension is continuously supplied and the dirt particles which are rejected by the screen slots fall to the bottom of the tank and are withdrawn. One end of the screen is wholly or partially closed to accommodate the drive mechanism which functions to rotate the prismatic screen about its longitudinal axis. The drive mechanism is secured to the inner surface of the hollow screen thereby closing or partially closing one end and accordingly the outward flow of the screened suspension is limited to the opposite open end of the screen.

The screened pulp suspension tends to thicken adjacent to the closed end of the screen thereby both retarding the outward flow through the open end and retarding the inward flow from the tank through the screen slots and correspondingly reducing the screen capacity. Such a closed or partially closed head end drive also limits the size of screen which may be utilized because of the torsional strains which result from the weight of the thickened pulp suspension, the sluggish outward flow and the braking or retarding effect of the deckle straps against the periphery of the screen adjacent to its open end, such braking effect creating a tendency for the open end of the screen to rotate slower than the driven end.

The principal objects of the invention are to provide an efficient and reliable screening apparatus having a greater capacity than screens heretofore in use; to provide such an apparatus which is of simple design and of strong and durable construction and which can readily be installed in conjunction with conventional apparatus; to provide an apparatus of the rotary screen type having a driving mechanism which is self-lubricating while in operation and which functions during relative oscillation of the screen; and to provide such an apparatus which remedies the aforesaid defects of rotary screens now in use.

Further objects relate to various features of construction and will be apparent from a consideration of the following description and the accompanying drawings, wherein:

2

Fig. 4 is an enlarged fragmentary side elevation showing the screen-rotating mechanism.

In accordance with the present invention my apparatus comprises a casing or tank which is preferably elongate and of generally U-shaped cross-section having one or more inlet openings through which a fluid suspension of solid material in a liquid may flow. One or more axially aligned screen sections, which may be of cylindrical or prismatic shape, are mounted within the tank so as to rotate about their common axis, the screen or screens, as the case may be, preferably having at both ends an opening through which the screened suspension may pass outwardly. The means for rotating the screen or screens comprises an annular gear-like driven member secured to and extending circumferentially about the screen in coaxial relation to its axis of rotation, and a gear-like driving member supported so as to engage the driven member, the peripheral portion of the driving member preferably being of a vulcanized rubber, synthetic rubber or equivalent resilient wear-resisting material which may also be elastic. The gear-like driven member may be circumposed about the exterior of the screen or about the interior thereof and in the latter case it is formed with internal teeth and the driving member is mounted within the screen so as to engage the teeth of the driven member. In either case, power transmission mechanism is connected with the driving member and the usual controls are provided. The apparatus may also be provided with one or more propellers within the screen or screens to direct and accelerate the flow of the screened suspension through the screen end openings.

Figure 1:
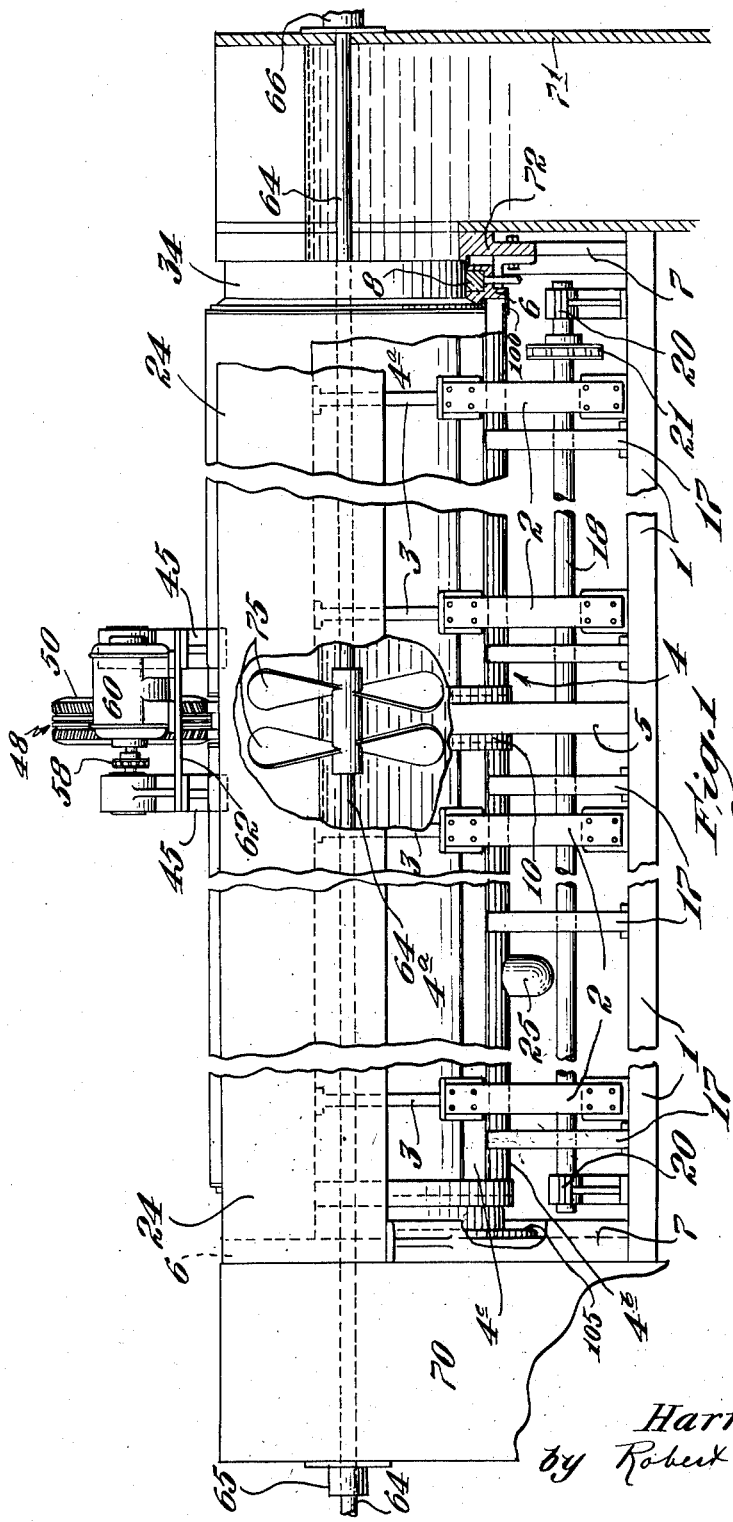
Fig. 1 is a side elevation, with parts broken away and shown in section, of a screening apparatus constructed in accordance with the present invention.
Figure 2:
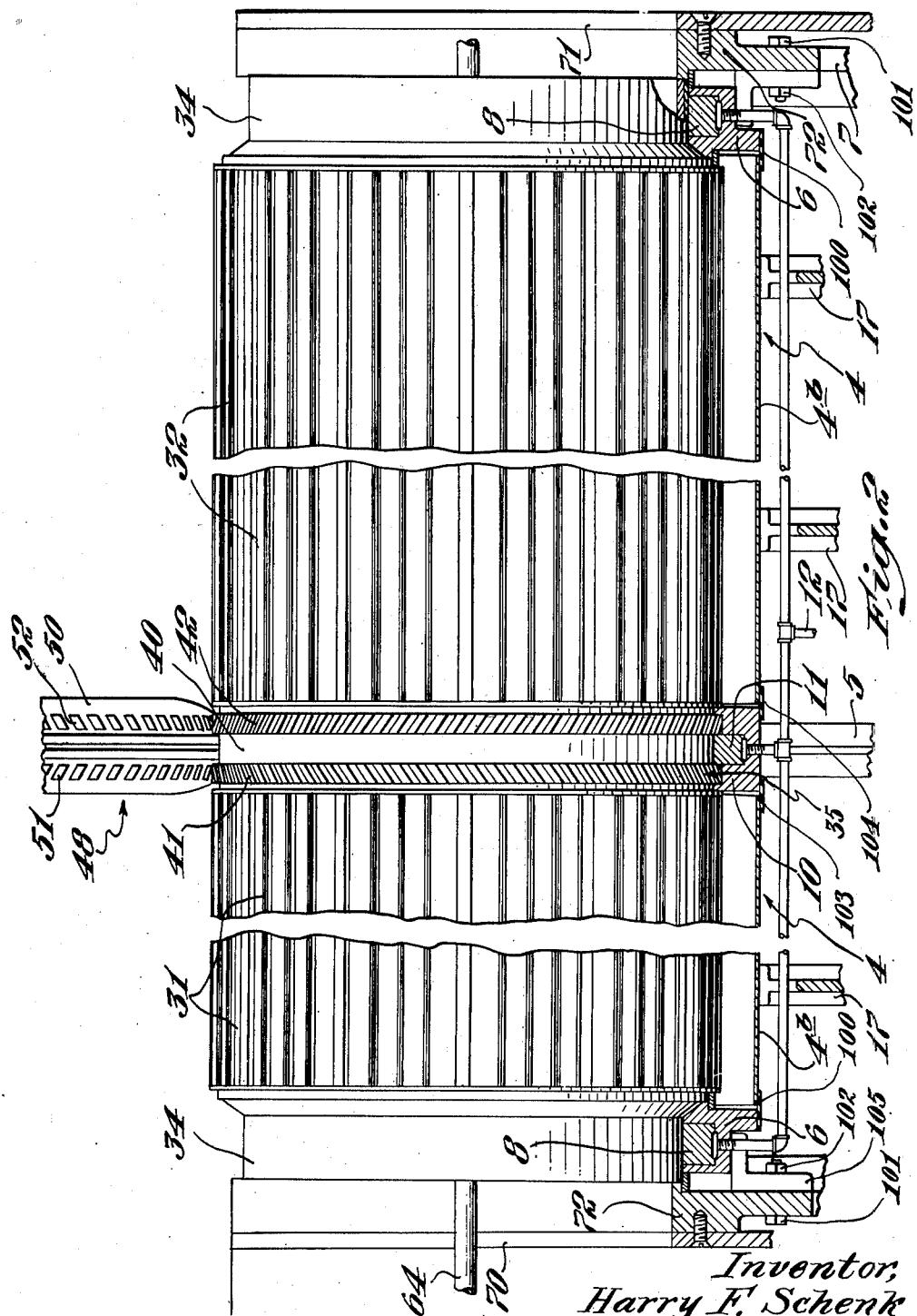
Fig. 2 is an enlarged side elevation of the rotary screen or drum and associated parts.

Referring to the accompanying drawings which show what is now considered a preferred embodiment of the invention, the numeral I designates an elongate base which carries a plurality of spaced upright, laterally flexible legs 2 which support cradles 3 on which an elongate generally U-shaped tank or casing 4 is partially mounted. The tank 4, as herein shown, is formed in two sections connected at their inner ends by flexible rubber strips 103, 104 and the U-shaped member 10 and supported on legs 5, although it is to be understood that the tank may be of one continuous section if desired. The opposite ends of the tank 4 are open and are connected by flexible rubber strips or hinges 100 to annular members 6 which are secured to the legs 7, by bolts and nuts 101, 102 which pass through the downwardly extending flange 105, as shown in Figs. 1 and 2. The members 6 carry semi-circular bearing members 8, such as Micarta bearings, and between the adjacent ends of its two sections, the tank 4 is provided with an intermediate U-shaped member 10 which not only serves as a coupling for the two sections, but also as a support on which is mounted a semi-circular bearing 11 of the above-mentioned type, each of the bearings 8 and 11 being associated with a lubricating line 12 (Fig. 2) connected with a lubricating pump (not shown). Thus each of the Micarta bearings 8 and 11 is lubricated internally with a separate water jet and each of the tank sections is mounted so that it may be independently oscillated or pulsated laterally.

As illustrated, each of the two sections of the tank 4 is made of three plates, the two oppositely disposed plates 4ª which form the upper portion and the intermediate plate 4ᵇ which forms the bottom portion thereof. These plates are secured together by longitudinally extending rubber strips 4ᶜ.

Figure 3:
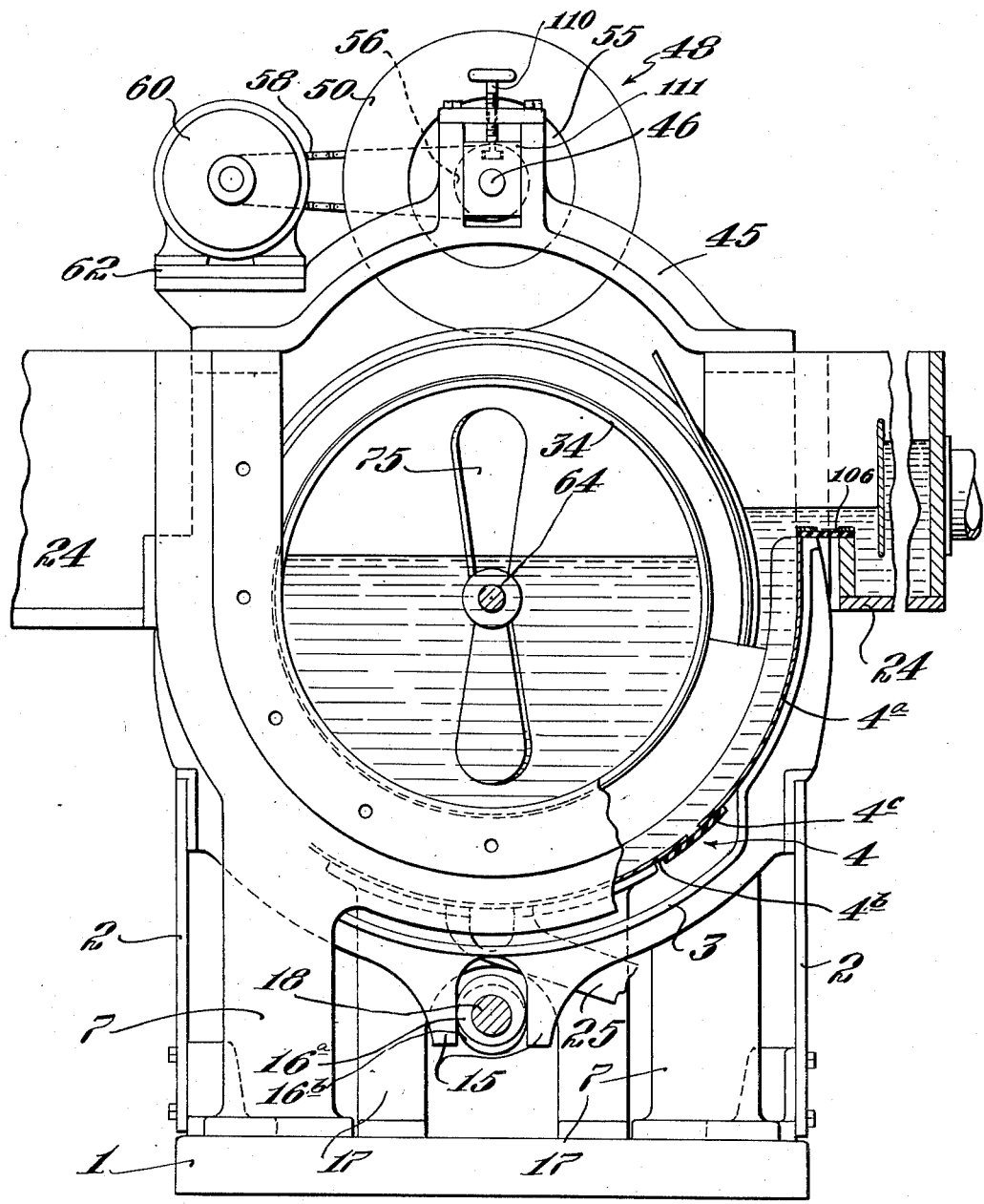
Fig. 3 is an enlarged end elevation, with parts broken away and shown in section, of the screening apparatus.

The lower part of each cradle 3 is formed with a depending yoke 15 (Fig. 3) which straddles eccentrics 16ª and 16ᵇ carried by shaft 18, the opposite ends of which are mounted in bearings 20 (Fig. 1). The cradles 3 are secured to and support the upper plates 4ª. The lower plates 4ᵇ are supported by the rigid legs 17 (Figs. 1 and 3). A sprocket 21, carried by shaft 18, is driven by a motor (not shown) to effect lateral oscillations of the plates 4ª relative to the screens. The flexible rubber strips or hinges 100, 103 and 104 function to prevent corresponding oscillation of the screen sections 31 and 32 and to permit independent oscillation of each section of the tank 4. The flexible rubber strips 4ᶜ function to permit progressive oscillation of the plates 4ª. The eccentrics 16ª and 16ᵇ (Fig. 3) are arranged to impart the oscillations or lateral vibrations at one end of plates 4ª and thereafter at the other end of said plates thereby to provide an end to end screen washing motion by the resultant longitudinal movement of the suspension in the tank relative to the screen sections. Additional cradles 3, legs 2 and eccentrics may be provided to provide such time staggered oscillations at additional longitudinally spaced intervals of the plates 4ª.

Since the apparatus herein shown is of the inflow type, one or both of the upper side wall portions of the tank 4 may be connected with flow boxes 24 by rubber strips 106 as shown in Fig. 3. The bottom wall 4ᵇ of the tank 4 is connected with drain or dirt discharge pipes 25, at least two of which are provided, one on each side of the U-shaped member 10 (only one of these discharge pipes is shown in the drawing, see Fig. 1).

Within the tank or casing 4 is a pair of aligned cylindrical screens 31 and 32, the body portions of which may be of stainless steel, bronze or other corrosion-resisting material, and formed with spaced circumferentially extending screening slots of conventional size and shape. The outer end of each screen is of slightly reduced diameter to provide a cylindrical bearing surface 34 having a snug fit within bearings 8 (Figs. 1 and 2) and the outer ends of the screens are thus rotatably supported within the tank 4. The inner ends of the screens are juxtaposed to each other and are connected by an annular gear-like member 35 which, as shown in Fig. 4, is formed with stepped flanges 36 and 37 to define recesses in which the inner ends of the screens are received, rivets, bolts or other suitable fastening means being provided firmly to secure the parts together.

The central outer peripheral surface of the member 35 is formed with a smooth circumferential track 40 engaging the intermediate bearing member 11 which thus provides a rotatable support for the inner ends of the screens, and along each side of the track 40 are gear teeth 41 and 42 of desired size and shape.

A pair of brackets 45 (Figs. 1 and 3) is mounted on or above the flow boxes 24 in any suitable manner and these brackets rotatably support a shaft 46 to which is keyed or otherwise suitably secured the driving member 48 comprising a rubber tire or shoe 50 having a periphery formed with spaced teeth 51, 52 meshing with the teeth 41, 42, respectively, of the driven member 35. The tire 50 is associated with an inner tube 54 (Fig. 4) and the assembled tire and tube are mounted on a disk wheel 55 (Fig. 3) in conventional manner. The shaft 46 carries a sprocket 56 connected by a driving chain 58 to a sprocket on the shaft of an electric motor 60 mounted on a cross bar or shelf 62 secured to the brackets 45. The driving member 48 is thus driven to rotate the screens 31, 32 on the bearings 8 and 11, and suitable electric controls (not shown) are provided for the motor so that, if desired, the speed of rotation of the screens may be varied.

The pressure of the periphery of the driving member 48 against the driven member 35 may be delicately adjusted by means of two adjusting screws 110, rotation of which moves the slide bearings 111 (which support the shaft 46 of the driving member) toward or away from the driven member thereby respectively increasing or decreasing said pressure. The appropriate pressure may be maintained by any other suitable means such as weights, levers, a hydraulic piston or the like.

Mounted within and extending axially through the screens is a shaft 64 (Figs. 1, 2 and 3) the ends of which are rotatably supported in bearings 65 and 66 mounted on the outer walls of discharge ducts 70 and 71 which are connected by coupling rings 72 to the annular member 6, as shown in Figs. 1 and 2. The central portion of the shaft 64 carries a pair of propellers 75 (Fig. 1) the blades of which are oppositely directed so as to induce an axial flow from the center or inner ends of the screens toward the outer end of each screen. Suitable driving means (not shown) are connected to one end of the shaft 64 and controls (not shown) to vary the speed of rotation are also provided.

Shower pipes (not shown) which extend inwardly through the outer ends of the screens may be supported from the walls of the discharge ducts 70, 71. These shower pipes function in the customary manner continuously to spray water upon the interior walls of the screens 31, 32 to prevent the accumulation of fibers or other solids in the screen slots.

The operation of the apparatus is as follows: The motor 60 and the driving means for the shafts 18 and 64 are first turned on, thereby rotating the screen and propellers, and effecting oscillation of the plates 4ª, while the stock to be screened flows through the boxes 24 into the tank 4 about the rotating screens 31 and 32. The difference in head between the stock in the tank 4 and the level of the screened suspension within the screens 31, 32, effects a continuous inward flow through the screens. Appropriate oscillation of the tank plates prevents exterior clogging of the screen slots and appropriate control of the pressure of the water in the shower pipes prevents interior clogging of the screen slots. The propellers 75 force the screened stock axially into the discharge ducts or channels 70, 71, thus maintaining a uniform outward flow of the screened suspension and maintaining the head of liquid within the screen at the desired operating level. Dirt and coarse particles screened out from the stock settle to the bottom of the tank 4 and are discharged through the pipes 25 in the usual manner.

While I have illustrated but one driving member 48 it will be understood that additional driving members may be provided to engage the same driven member 35. Additional driven members 35 may also be provided at spaced intervals either outside or inside of the screen, each provided with one or more driving members.

The tire or shoe 50 of the driven member 48 preferably is of the heavy duty tractor type and its tread may be provided with any conventional type of self-cleaning cleats and the teeth of the driven member may be arranged correspondingly. The tube 54 may be of the heavy duty Butyl type and it may be inflated with air, hydrogen, water and air, liquid and hydrogen, or with any other suitable medium.

It will be apparent to persons skilled in the art that a screen constructed in accordance with this invention is a marked improvement because it has a capacity of from two to six times or greater than the capacity of a closed or partially closed head type; the thickening of the suspension within the screen is eliminated; the apparatus can readily be installed in conjunction with conventional auxiliary apparatus; the liquid suspension lubricates the interengaging parts of the tire tread 50 and the driven member 35 to prevent wearing of the latter and the resultant discoloration of the liquid suspension; due to the resiliency of the tire 50 its bearings are not unduly vibrated and its engagement with the driven member 35 is not disturbed by the vibration or oscillation of the screens; by utilizing a timed staggered pulsating or oscillating mechanism for the individual plates of the tank 4 an end to end washing motion of the suspension upon the screen is provided to better clean the slots and still further increase the screening capacity; and the hydraulics involved in forming a level sheet of paper on fast running paper machines is greatly simplified because fewer screen units are required to satisfy the capacity of the paper machines.

It should be understood that the present disclosure is for the purpose of illustration only, and that this invention includes all modifications and equivalents which fall within the scope of the appended claims.

I claim:

1. Apparatus for screening a suspension of solid material in a liquid comprising an elongate tank for receiving the suspension to be screened, a hollow screen rotatably mounted within said tank with its axis of rotation substantially horizontal and having an opening of substantial size at each end through which the screened suspension may pass outwardly, bearing members mounted adjacent to the screen openings at opposite ends of the tank for rotatably supporting the screen, drive mechanism for rotating said screen including an intermediate bearing member mounted on the inner surface of the tank intermediate its ends, an annular driven member mounted peripherally of the screen intermediate its ends said annular member being formed with a smooth circumferential track engageable with said intermediate bearing member and with a series of teeth adjacent to said track, said teeth being moistened by the liquid suspension during revolution of the screen, and a driving member formed with teeth meshing with the teeth of said driven member and an inflow passage communicating with the space between the inner surface of the tank and the periphery of the screen, the line of mesh of the teeth of the driving and driven members being located above the normal surface level of the liquid suspension in the inflow passage.

2. Apparatus for screening a suspension of solid material in a liquid comprising an elongate tank for receiving the suspension to be screened, a hollow screen rotatably mounted within said tank with its axis of rotation substantially horizontal and having an opening of substantial size at each end through which the screened suspension may pass outwardly, bearing members mounted adjacent to the screen openings at opposite ends of the tank for rotatably supporting the screen, drive mechanism for rotating said screen including an intermediate bearing member mounted on the inner surface of the tank intermediate its ends, an annular driven member mounted peripherally of the screen intermediate its ends said annular member being formed with a smooth circumferential track engageable with said intermediate bearing member and with circumferentially extending teeth adjacent to each side of said track, said teeth being moistened by the liquid suspension during revolution of the screen, and projecting outwardly from the surface of the track a driving member formed with teeth meshing with the teeth of said driven member and an inflow passage communicating with the space between the inner surface of the tank and the periphery of the screen, the line of mesh of the teeth of the driving and driven members being located above the normal surface level of the liquid suspension in the inflow passage.

HARRY F. SCHENK.

REFERENCES CITED

The following references are of record in the file of this patent:

UNITED STATES PATENTS

| Number | Name | Date |
|---|---|---|
| Re. 11,813 | Michaelis | Mar. 20, 1900 |
| 74,914 | Hitchcock et al. | Feb. 25, 1868 |
| 147,717 | Warren | Feb. 17, 1874 |
| 419,465 | Mitchell | Jan. 14, 1890 |
| 650,034 | Carkeck | May 22, 1900 |
| 1,042,724 | Spangenberg | Oct. 29, 1912 |
| 1,164,427 | Storrer | Dec. 14, 1915 |
| 1,424,203 | Keller | Aug. 1, 1922 |
| 1,505,835 | White | Aug. 19, 1924 |
| 1,520,371 | Spangenberg | Dec. 23, 1924 |
| 1,757,533 | Lewis | May 6, 1930 |
| 2,433,490 | Stapley et al. | Dec. 30, 1947 |
| 2,441,901 | Petersen | May 18, 1948 |
| 2,483,200 | Haug | Sept. 27, 1949 |

FOREIGN PATENTS

| Number | Country | Date |
|---|---|---|
| 19,366 | Great Britain | of 1909 |
| 316,326 | Germany | Nov. 25, 1919 |